United States Patent Office 3,452,012
Patented June 24, 1969

3,452,012
PROCESS FOR THE PREPARATION OF DRY ALKALI DICHLORISOCYANURATES
Ferdinand Langenhoff, Ranzel, and Arnold Lenz, Cologne-Stammheim, Germany, assignors to Dynamit Nobel Aktiengesellschaft, Troisdorf, Germany, a corporation of Germany
No Drawing. Filed Nov. 8, 1966, Ser. No. 593,239
Claims priority, application Germany, Nov. 9, 1965,
D 48,606
Int. Cl. C07d 55/40
U.S. Cl. 260—248
10 Claims

ABSTRACT OF THE DISCLOSURE

Process for preparing dry alkali dichlorisocyanurates comprising reacting dichlorisocyanuric acid with an equimolar quantity of an alkali hydroxide in the form of its suspension in an aliphatic, liquid, $C_1$ to $C_3$ chlorinated hydrocarbon at a temperature of from 0 to 35° C.

---

This invention relates to a process for the preparation of dry alkali dichlorisocyanurates. More particularly, this invention relates to a process for the preparation of dry alkali dichlorisocyanurates by the reaction of dichlorisocyanuric acid with alkali hydroxide.

Various methods are known by which the alkali salts of dichlorisocyanuric acid can be manufactured. A particularly well-known method is the reaction of potassium hydroxide with dichlorisocyanuric acid in an aqueous medium at a specified temperature and pH range. Variations of the pH value can result in the partial decomposition of the end product (where the critical pH is exceeded), or the liberation of bound chlorine as hypochlorous acid (where the critical pH value is not reached). Furthermore, in the final treatment of the end product, in the drying for example, decomposition can easily occur with the loss of chlorine, so that the yield of chlorinated cyanuric acid is relatively poor.

The above-mentioned difficulties can be overcome in part by constantly separating the crystalline potassium dichlorisocyanurate from the reaction mixture of dichlorisocyanuric acid with lye and enriching the remaining solution with further amounts of the starting materials. The time of stay of the end product in the solution is in this manner kept relatively short, thereby avoiding to a great extent the decomposition of the salt that is formed. In a procedure of this kind the critical pH value can be better maintained. The recovery of the anhydrous salt, however, is difficult, since the chlorine atoms of the molecule are not stably bonded and react very easily, resulting in the decomposition of the cyanuric acid molecule. Even at a temperature above around 20° C., an irreversible reaction can take place very quickly at the expense of the active chlorine in the dichlorisocyanurate and with the formation of secondray products.

According to another of the known methods, trichlorisocyanuric acid and tripotassium cyanate are reacted in an aqueous medium under certain specified conditions. In this reaction a pH of between 7 and 7.5 must be maintained, which can be done by the controlled addition of the reaction components. The resulting reaction mixture must, following the reaction, be concentrated at reduced pressure (20 mm. Hg) and dried at 150° C. The yield with reference to the starting tripotassium cyanurate amounts in this process only to 89.5%.

It is an object of the present invention to provide a process for the preparation of dry alkali dichlorisocyanurates avoiding the disadvantages associated with the known procedures.

Another object of the invention is a method for the preparation of dry alkali dichlorisocyanurate, in yields substantially corresponding to theory.

Still another object of the invention is a method for the preparation of dry alkali dichlorisocyanurate, avoiding the necessity for strict maintenance of the pH in a narrow range, concentrating and drying but without sacrificing in any way the yield of recovered alkali dichlorisocyanurates.

These and other objects and advantages of the invention will become apparent from a consideration of the following disclosure.

In accordance with the invention, it has now been found that the disadvantages of the prior art processes for the manufacture of dry alkali dichlorisocyanurates by the reaction of dichlorisocyanuric acid with an equimolar quantity of an alkali hydroxide at a temperature ranging from 0 to 35° C., and preferably 5 to 20° C., followed by the separation and drying of the reaction product, are avoided if the reaction is carried out with the dichlorisocyanuric acid admixed with a suspension of alkali hydroxide in an aliphatic, chlorinated, liquid hydrocarbon having 1 to 3 carbon atoms. Preferably the dichlorisocyanuric acid is used in the form of its suspension in the same liquid hydrocarbon.

The important advantages of the process of the invention lie in the elimination (1) of the control of the pH value, (2) of the concentration steps, and (3) of the drying of the water containing alkali dichlorisocyanurates produced in the reaction.

Furthermore, the heat of neutralization that is produced in the reaction can advantageously be removed in the evaporation of the suspending medium, thereby easily preventing local overheating of the reaction mixture. Suitable alkali hydroxides for the process of the invention include the hydroxides of sodium, potassium, and lithinum, as well as those of caesium and rubidium. Examples of suitable suspension media for use in the invention are all of the aliphatic, partially chlorinated and/or perchlorinated liquid hydrocarbons having 1 to 3 carbon atoms, as, for instance, methylenedichloride, chloroform, carbon tetrachloride, 1,1-dichlorethane, 1,2-dichlorethane, propyl chloride, and the like, which can readily be removed from the end product by drying. Particularly advantageous suspension media are chloroform and carbon tetrachloride. Furthermore, there may be used mixtures of any of the above-named suspension media.

A preferred method for carrying out the process of the invention consists in introducing into a suspension of dichlorisocyanuric acid in carbon tetrachloride or other aliphatic, chlorinated hydrocarbon, at a temperature of between 0 and 35° C., and preferably between 5 and 20° C., alkali hydroxide that has been ground under carbon tetrachloride. The initial amount of the alkali hydroxide introduced into the reaction is so selected that it amounts to approximately 10% of the total quantity required for complete reaction. Not until the reaction has started and the temperature has risen is the remainder gradually added. The amount of the suspension medium is most advantageously chosen so that a pasty consistency prevails after the reaction. The reactants are used in stoichiometric amounts. After the alkali dichlorisocyanurate that forms has been treated for removal of the major portion of the moisture, the remaining moisture is removed in an air current or by the application of a vacuum, in the conventional manner. The yield in the process of the invention amounts to substantially 100%.

To accelerate the onset of the reaction of the solid alkali hydroxide with the suspended dichlorisocyanuric acid, a small amount of water may be added. The amount of water should not amount to more than 15 mol percent with reference to the starting alkali hydroxide. Preferably only as much water is used as corresponds to the solubility of the water in the aliphatic chlorinated hydrocarbon that is used. This very small amount of added water and of water of neutralization can easily be removed in the drying process without decomposition of the salt.

The alkali dichlorisocyanurates prepared according to the invention can be used as bleaching agents, cleansers and disinfectants in washing compounds. They can also be used as intermediates for further reactions.

The invention is illustrated in the following examples, it being understood that the same are not to be construed as a limitation thereof.

Example 1

400 g. NaOH (10 mols) were suspended in 2 liters of carbon tetrachloride and the resulting mixture was then introduced into a vessel equipped with an agitator. After cooling the mixture to 5° C., 1.48 kg. dichloroisocyanuric acid (10 mols) were introduced into the vessel with intense agitation of the contents of the vessel.

The temperature was at first maintained at 5° C. until the reaction became apparent as evidenced by a temperature rise. At the same time, sufficient carbon tetrachloride was gradually evaporated (by the application of a low vacuum) so that a semi-pasty consistency was produced and so that the temperature did not rise above 15° C. 1.35 liters of carbon tetrachloride were recovered by condensation. The stirring process was continued at room temperature until the evolution of heat had ceased.

The reaction product was recovered by suction filtering, washed with $CCl_4$ and dried in an air stream.

The yield amounted to 2.19 kg. of sodium dichlorisocyanurate. The theoretical chlorine content amounted to 32.2%; 31.1% was found.

Example 2

800 g. sodium hydroxide (20 mols) were suspended in one liter of carbon tetrachloride. At first, 45 ml. (2.5 mols water) were added to 100 to 200 ml. of the hydroxide suspension (corresponding to about 100 g. of hydroxide), and the resulting mixture was added with stirring, at 0 to 5° C., to a mixture of 3.96 kg. dichlorisocyanuric acid (20 mols) in 4 liters carbon tetrachloride.

After the reaction had set in, the balance of the alkali hydroxide suspension was slowly added, while a temperature of 15 to 20° C. was maintained.

After final processing of the reaction product, 4.38 kg. sodium dichlorisocyanurate were obtained in a 100% yield.

The chlorine content amounted to 32.2% theoretically, and 30.4% was found.

Example 3

280 g. KOH (5 mols) were suspended in one liter carbon tetrachloride, and 990 g. dichlorisocyanuric acid were added thereto in a vessel equipped with an agitator, following precooling to 5 to 10° C., and with thorough mixing. After the reaction started, sufficient $CCl_4$ was evaporated using low vacuum for the evaporation, that a temperature of 15 to 20° C. was not exceeded. After the end of the reaction, the agitation was continued for about one hour. The product was suction-filtered and air-dried.

The yield amounted to 1.15 kg. potassium dichlorisocyanurate.

The chlorine content (theory) was 30.1%; 28.9% was found.

We claim:
1. Process for the preparation of dry alkali dichlorisocyanurates, which comprises reacting dichlorisocyanuric acid with an equimolar quantity of an alkali hydroxide in the form of its suspension in aliphatic chlorinated liquid hydrocarbons having from 1 to 3 carbon atoms at a temperature in the range of from 0 to 35° C., separating the alkali dichlorisocyanurate thereby formed, and drying the same.

2. Process according to claim 1, wherein said reaction is effected at a temperature of 5 to 20° C.

3. Process according to claim 1, wherein said alkali hydroxide is a member selected from the group consisting of sodium, potassium, lithium, caesium, and rubidium hydroxide.

4. Process according to claim 1, wherein said aliphatic chlorinated liquid hydrocarbon is a member selected from the group consisting of methylenedichloride, chloroform, carbon tetrachloride, 1,1-dichlorethane, 1,2-dichlorethane, and propyl chloride.

5. Process according to claim 1, wherein said dichlorisocyanuric acid is used in the form of its suspension in an aliphatic chlorinated liquid hydrocarbon having from 1 to 3 carbon atoms.

6. Process according to claim 5, wherein said alkali hydroxide and said dichlorisocyanuric acid are both suspended in the same liquid hydrocarbon.

7. Process according to claim 1, wherein water is added in a quantity corresponding to a maximum of 15 mol percent of the alkali hydroxide to the suspension of the dichlorisocyanuric acid and/or of the alkali hydroxide.

8. Process according to claim 1, which comprises effecting said reaction by contacting said dichlorisocyanuric acid with 10% of the total quantity of alkali hydroxide required for the reaction and when the temperature of the reaction has risen introducing the balance of the alkali hydroxide required to complete the reaction.

9. Process according to claim 1, wherein said alkali hydroxide is sodium hydroxide.

10. Process according to claim 1, wherein said alkali hydroxide is potassium hydroxide.

References Cited

UNITED STATES PATENTS 3,336,228    8/1967    Fuchs et al. _____ 260—248 XR

FOREIGN PATENTS 1,122,535    1/1962    Germany.

HENRY R. JILES, *Primary Examiner.*

JOHN M. FORD, *Assistant Examiner.*